W. F. HOLSKE.
FRICTION-CLUTCHES.

No. 174,363.

Patented March 7, 1876.

WITNESSES:
C. Neveux
A. F. Terry

INVENTOR:
W. F. Holske
BY
[signature]
ATTORNEYS.

UNITED STATES PATENT OFFICE.

WILLIAM F. HOLSKE, OF NEW YORK, N. Y.

IMPROVEMENT IN FRICTION-CLUTCHES.

Specification forming part of Letters Patent No. 174,363, dated March 7, 1876; application filed July 31, 1875.

*To all whom it may concern:*

Be it known that I, WILLIAM F. HOLSKE, of New York city, in the county and State of New York, have invented a new and useful Improvement in Friction-Clutches, of which the following is a specification:

In this invention a fast pulley, usually employed in connection with the loose or band pulley, is dispensed with, the band-pulley being itself provided with a projecting hub-rim to adapt it to receive ribs formed on each of a series of wedge-shaped blocks, which are connected with a sliding hub, by means of dovetailed grooves, so as to slide thereon, and thus, when the latter is shifted on the feathered portion of the shaft, to lock with the band-pulley and cause it to rotate with the shaft, as hereinafter described.

Figure 1:
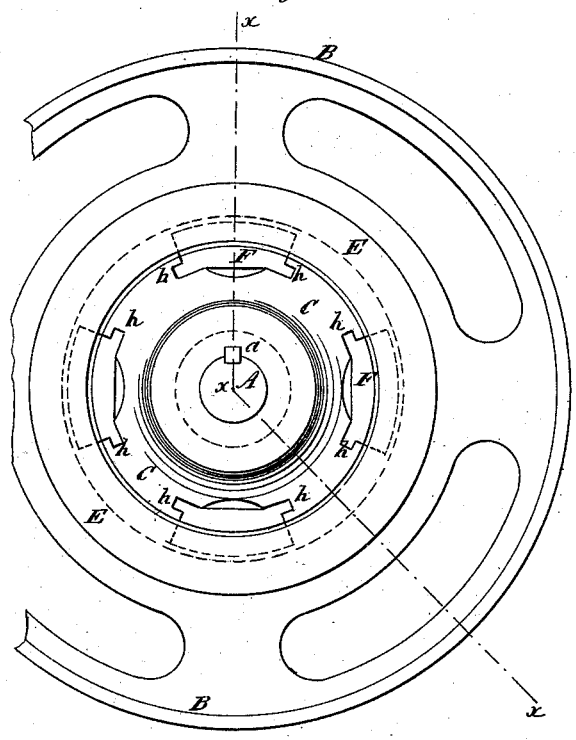
Figure 2:
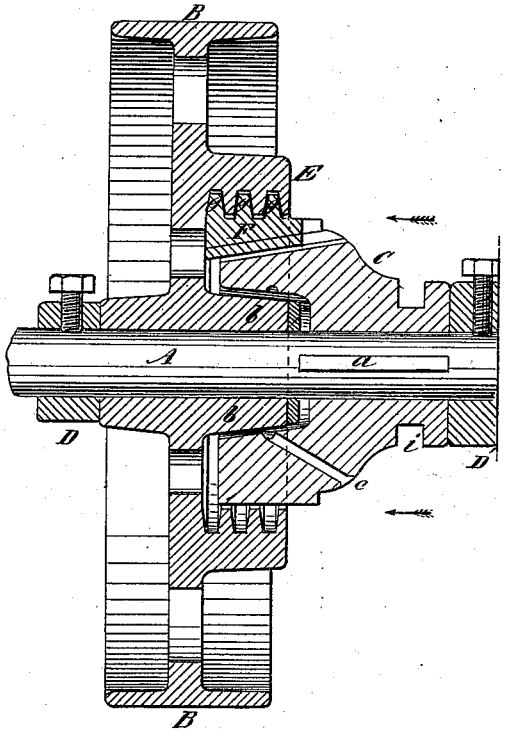
Figure 3:
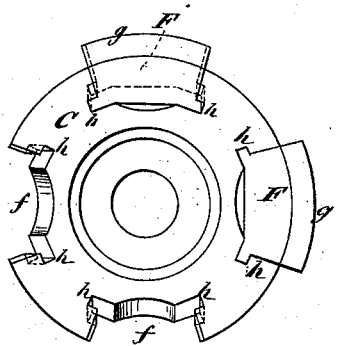
Figure 4:
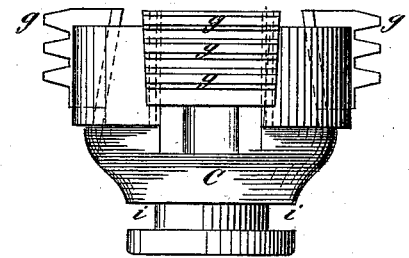

Referring to the drawing, Figure 1 is a side elevation of my improvement. Fig. 2 is a cross-sectional elevation of the same through the line $x\,x$ in Fig. 1. Fig. 3 is an end elevation of the sliding hub, showing the locking-wedges and their seats. Fig. 4 is a plan view of the same.

Similar letters in the various figures refer to the same parts.

A is the pulley-shaft; B, the loose pulley; C, the sliding hub, which by the feather, at $a$, is caused to turn with the shaft, and permitted to slide longitudinally thereon. D D' are the usual stops. The central portion of pulley B is provided with a hub, one end of which, $b$, is made of conical form, and receives the interior of the hub C, which is of corresponding form. Lubricating-oil is conveyed between the surfaces of the pulley-cone and the hub by oil-channel $c$. E is an annular rim attached to the side of the pulley A. Seated upon the hub C, in seats of the form shown at $f$, between the inside of the rim E and the hub C, I arrange one or more locking-wedges F, which are provided with beveled teeth $g$ on their outer surfaces, which fit into corresponding beveled cavities upon the inside of the rim E. The inner surfaces or locks of the wedges F are beveled, and provided at their edges with beveled or inclined feathers or tongues, $h$, which fit within corresponding inclined grooves made in the sides of the seats $f$ in the beveled hub C. At $i$, in the hub C, is the usual groove for the fork of the operating-lever. When the hub C is pushed in the direction of the arrows, the wedges F, by reason of their inclined tongues seated within the corresponding inclined grooves in the hub C, are pushed outward, so as to cause their beveled teeth $g$ to press against and become locked within the corresponding recesses of the rim E, thereby firmly locking the pulley B and hub C, and causing the pulley to revolve with shaft A; but when the hub C is moved in the contrary direction the wedges F are drawn inward toward the center of the pulley, and the teeth $g$ are unlocked from the rim E, leaving the pulley B loose upon the shaft A. Thus the lateral movement of the hub C in one direction pushes the wedges F outward from the center of the pulley, and the contrary movement of the hub draws the wedges inward toward the center of the pulley, thereby locking or unlocking the pulley B. In the case of small-sized or special pulleys, the interior surface of the pulley periphery takes the place of the rim E, and such surface is provided with beveled recesses to receive the teeth $g$, and in such pulleys I omit the rim E.

I do not limit or confine myself to the exact form or position of any of the parts here shown, as they may be varied without departing from my invention.

Having thus described my invention, I claim and desire to secure by Letters Patent—

The combination, with the loose band-pulley B, having the inner projecting rim E, of the wedges F and hub C, sliding on feathers $a$, as shown and described.

WM. F. HOLSKE.

Witnesses:
T. B. MOSHER,
ALEX. F. ROBERTS.